(12) United States Patent
Rowland

(10) Patent No.: US 6,405,318 B1
(45) Date of Patent: Jun. 11, 2002

(54) INTRUSION DETECTION SYSTEM

(75) Inventor: Craig H. Rowland, Austin, TX (US)

(73) Assignee: Psionic Software, Inc., Austin, TX (US)

( * ) Notice: Subject to any disclaimer, the term of this patent is extended or adjusted under 35 U.S.C. 154(b) by 0 days.

(21) Appl. No.: 09/268,084

(22) Filed: Mar. 12, 1999

(51) Int. Cl.$^7$ ............................................. G06F 11/30
(52) U.S. Cl. ..................................................... 713/200
(58) Field of Search ............................ 713/200, 164; 709/229

(56) References Cited

U.S. PATENT DOCUMENTS

| | | | |
|---|---|---|---|
| 5,278,901 A | 1/1994 | Shieh et al. ................... 380/4 |
| 5,365,581 A | * 11/1994 | Baker et al. ................. 379/196 |
| 5,495,521 A | * 2/1996 | Rangacher ................... 379/95 |
| 5,557,742 A | 9/1996 | Smaha et al. ................ 395/186 |
| 5,621,889 A | 4/1997 | Lermuzeaux et al. ....... 395/186 |
| 5,623,601 A | * 4/1997 | Vu ........................... 395/187.01 |
| 5,796,942 A | 8/1998 | Esbensen ............... 395/187.01 |
| 5,798,706 A | 8/1998 | Kraemer et al. ........ 340/825.07 |
| 5,825,750 A | * 10/1998 | Thompson ................... 370/244 |
| 5,991,881 A | * 11/1999 | Conklin ....................... 713/201 |
| 6,014,715 A | * 1/2000 | Stoevhase .................... 710/11 |
| 6,044,465 A | * 3/2000 | Dutcher et al. ............. 713/200 |
| 6,070,244 A | * 5/2000 | Orchier et al. .............. 713/201 |
| 6,073,240 A | * 6/2000 | Kurtzberg ................... 713/200 |

* cited by examiner

*Primary Examiner*—Gail Hayes
*Assistant Examiner*—Jeff Leaniny
(74) *Attorney, Agent, or Firm*—Taylor Russell & Russell, P.C.

(57) ABSTRACT

A computer-implemented intrusion detection system and method that monitors a computer system in real-time for activity indicative of attempted or actual access by unauthorized persons or computers. The system detects unauthorized users attempting to enter into a computer system by comparing user behavior to a user profile, detects events that indicate an unauthorized entry into the computer system, notifies a control function about the unauthorized users and events that indicate unauthorized entry into the computer system and has a control function that automatically takes action in response to the event. The user profiles are dynamically constructed for each computer user when the computer user first attempts to log into the computer system and upon subsequent logins, the user's profile is dynamically updated. By comparing user behavior to the dynamically built user profile, false alarms are reduced. The system also includes a log auditing function, a port scan detector and a session monitor function.

31 Claims, 11 Drawing Sheets

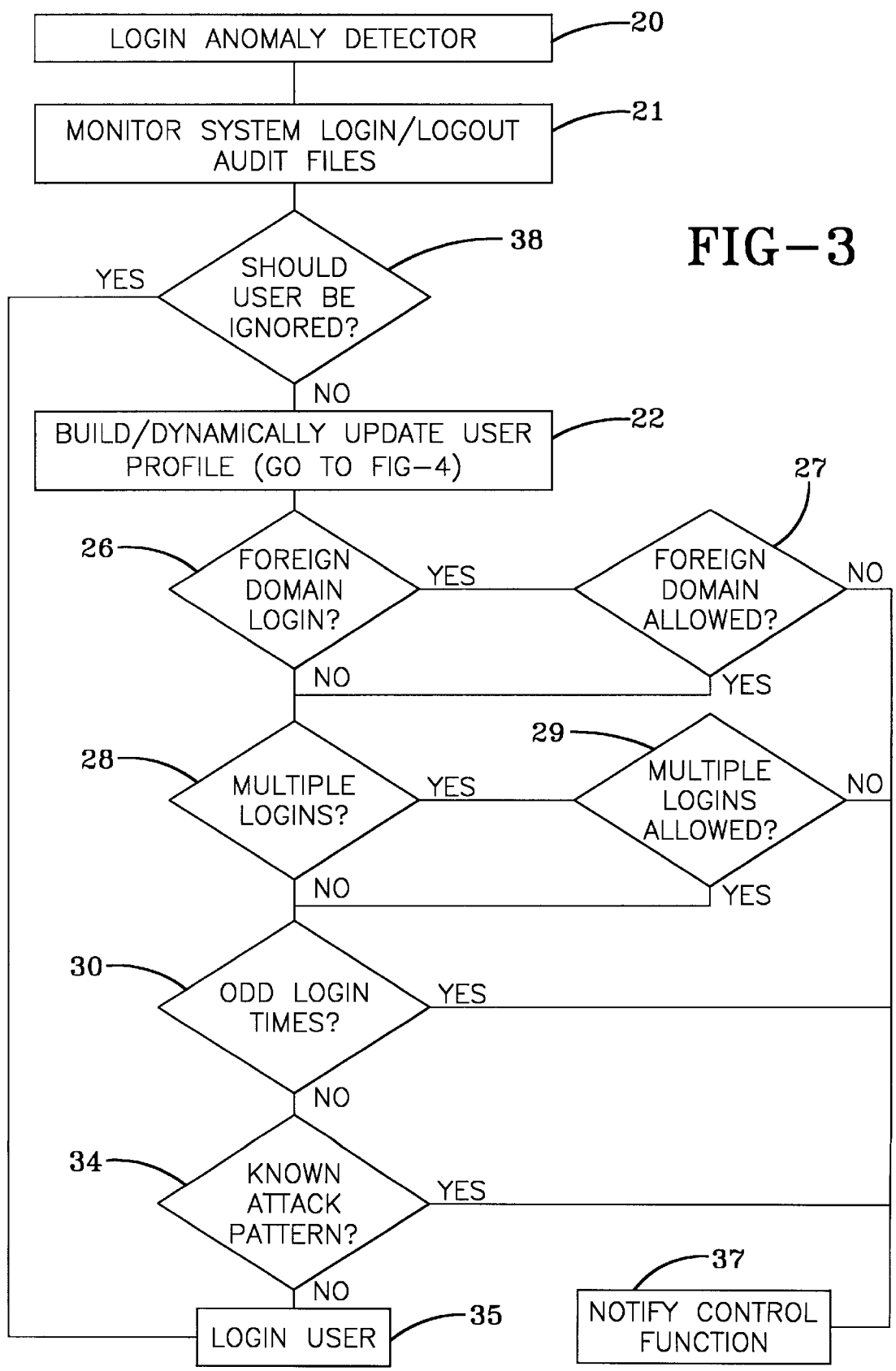

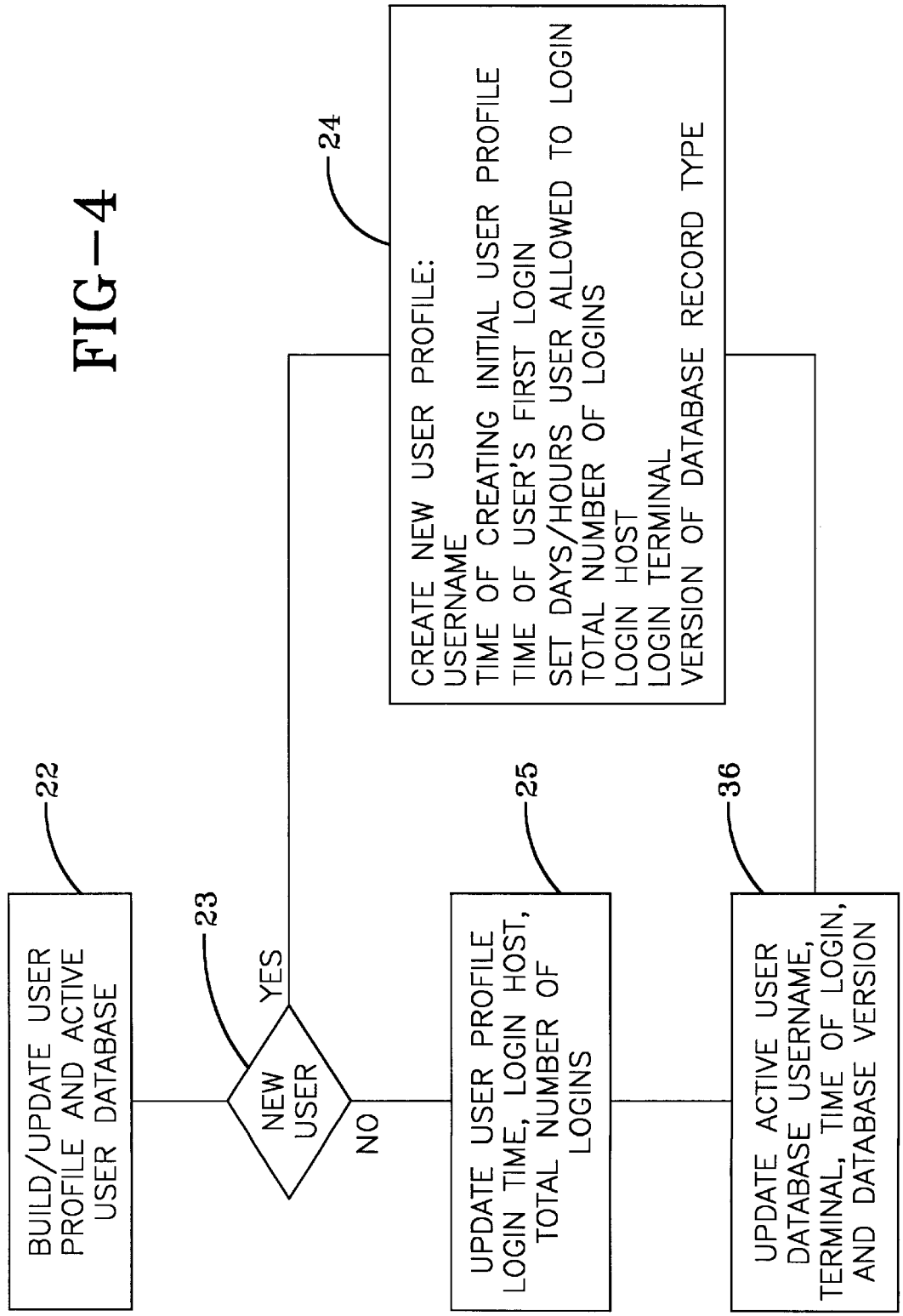

INTRUSION DETECTION SYSTEM

TECHNICAL FIELD OF THE INVENTION

The present invention relates generally to intrusion detection for a computer system. More particularly, the invention is a computer-implemented intrusion detection system and method that monitors a computer system for activity indicative of attempted or actual access by unauthorized persons or computers.

BACKGROUND

Because of the increasing reliance on Internet, Intranet and extranet network computer access, intrusion into computer systems by unauthorized users is a growing problem. An intrusion is unauthorized access or attempted access into or unauthorized activity in a computer or information system. Intrusion detection technologies are therefore becoming extremely important to improve the overall security of computer systems. Intrusion detection is the process of identifying that an intrusion has been attempted, is occurring or has occurred.

In most intrusion detection systems, data may be automatically collected and reduced but the analysis of that data usually remains manual. Profiling and pattern recognition techniques also have been used to analyze the data collected and presented to an intrusion detection system. The off-line analysis involves determining normal behavior for a user, application or system. The normal behavior is then used to develop sets of rules. Significant deviations from the rules, referred to as anomalous behavior, may then be flagged as potential intrusions. Some intrusion detection systems, based on anomaly detection techniques, look for statistically anomalous behavior, that is, behavior that appears unusual when compared to other user behavior. One drawback of anomaly detection systems is that they are prone to both false positive and false negative alerts because the rules are general in nature and not specific for the behavior of each user. False positives occur when the intrusion detection system identifies an event as an intrusion when none has occurred. False positives may divert the attention and time of the system administrator and security staff and if frequent enough, may cause a lack of confidence in the intrusion detection system. False negatives are instances where the intrusion detection system fails to detect an intrusion while it is occurring or after it has occurred. The result may be slow or no response to the intrusion that can result in financial loss and system damage. False negatives often occur because the models used to profile the anomalous behavior do not adequately predict the intruder behavior and its result within the computer system.

Some intrusion detection systems use expert systems, which are driven from an encoded rule base to monitor policy compliance. The expert system applies the rules to assure all users are operating within their privileged rights. Even in the expert system, the encoded rules are usually generated by profiling the anomalous behavior and then building a rule based system. This means that the expert system intrusion detection system at present suffers from the same problems such as false positives and false negatives as the anomalous detection systems. Other systems have passive monitor functions that continually analyze data presented to them. They are similar to antivirus functions in that they can only detect what has been defined to them. Another type of intrusion detection system is a scanner. Unlike other intrusion detection tools that report when a threshold has been exceeded, scanners actively attempt to find security holes (called vulnerabilities) and unauthorized hardware and software.

The above mentioned intrusion detection methods have many drawbacks. One is that the systems can only detect and monitor what has been previously defined to them, either using expert system rules or rules developed through data collection reduction and analysis or through profiling. This can result in false negatives because unknown attacks have not been previously defined. In addition, most systems only analyze and develop profiles and patterns after the fact. These profiles and patterns of behavior are subsequently incorporated into rule-based systems to recognize future attacks. Even in those instances where alerts are issued in near real-time, valuable time and the intruder's trail can be lost. In addition, many of these systems require human intervention, both in the initial analysis of data and profile and pattern recognition building steps and when an anomalous event has occurred, to determine the action to be taken. Relying on human intervention can delay the identification of the intrusion and may not prevent network damage or exploitation.

To be able to detect intrusions as they are occurring or soon after, there is a need for the intrusion detection system to be a real-time system. There is a need to automatically build profiling data specific for each user or class of users that can be used to determine normal actions for a user to reduce the occurrence of false alarms and to improve detection. There is a need for a system that can detect suspicious actions, determine the source and institute autonomous responses. There is also a need for the intrusion detection system to take automatic action, without waiting for a human administrator to intervene and act, to mitigate the effects of an intrusion and to prevent future actions. There is also a need to coordinate information transfer within host, multi-host and network environments so responses to intrusions can be coordinated. In addition, there is a need to combine the above listed capabilities with real-time monitoring of log audit files, port scan detection capability and session monitoring.

SUMMARY

The present invention provides a real-time intrusion detection method and system. The intrusion detection system automatically and dynamically builds user profile data (known as a signature) for each user (or alternatively, a class of users) that can be used to determine normal actions for each user to reduce the occurrence of false alarms and to improve detection. The user profile data (signature) is saved and updated every time the user logs on and off the system. The advantage of dynamically building user profile data based on past user behavior and comparing it to that user's current behavior is that the number of false alarms is reduced. In addition, there is no need to enter sets of rules prior to system initialization. The system detects suspicious actions, determines the source and institutes autonomous responses. The system acts to mitigate the effects of an intrusion and to prevent future actions without waiting for human action. The automatic actions to be taken can be specified by the system administrator prior to initialization of the system. The automatic actions can be tailored to address the specific anomaly detected by the intrusion detection system. For example, through a local or system controller, the system can log the events, disable user accounts and block access to the system. In one embodiment, the system coordinates information transfer within host, multi-host and network environments to coordinate intrusion response. The system combines the above listed capabilities with real-time monitoring of log audit files, port scan detection capability and session monitoring.

Throughout this document, use of the terms dynamic or dynamically in relation to a process means that the process is operating in real-time or close to real-time.

BRIEF DESCRIPTION OF THE DRAWINGS

These and other features, aspects and advantages of the present invention will become better understood with regard to the following description, appended claims and accompanying drawings where:

FIG. 3 is a flow diagram of the login anomaly detection function.

FIG. 4 is a flow diagram of the user profile database and active user database update function

DETAILED DESCRIPTION OF THE DRAWINGS

Figure 1:
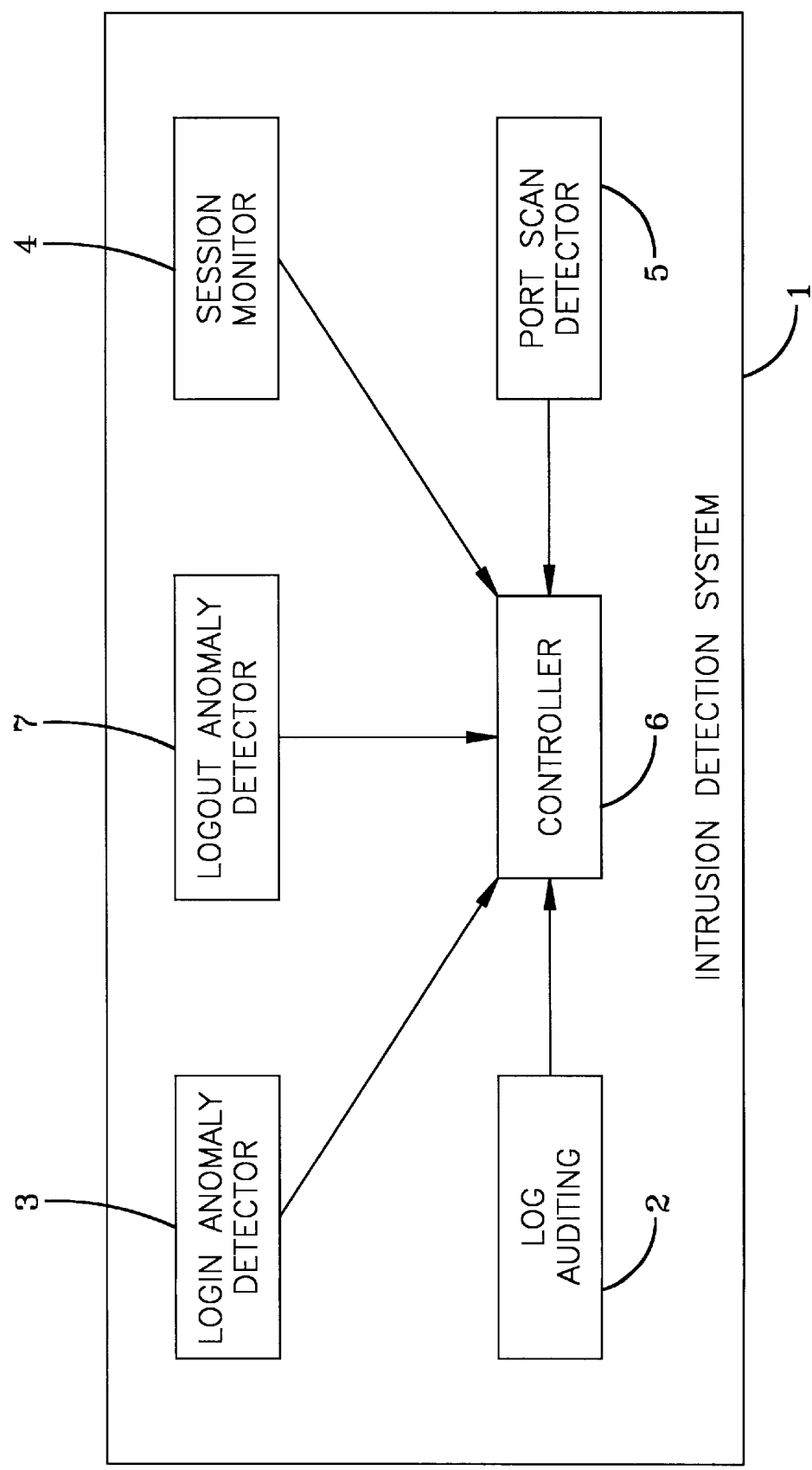
FIG. 1 shows a functional block diagram of the host based intrusion detection system.

FIG. 1 shows a functional block diagram of the intrusion detection system. The system is comprised of a log audit function 2, a login anomaly detection function 3, a logout anomaly detection 7, a session monitor function 4 and a port scan detector function 5 interfacing with a local controller function 6. The log audit function 2, login anomaly detection function 3, logout anomaly detection function 7, session monitoring function 4 and port scan detector function 5 all operate in real-time to detect activity indicative of an attack by unauthorized users or systems. The log audit function continuously monitors system log files for anomalous activity which can include known suspicious activity and unknown system anomalies. When anomalous behavior occurs, the log audit function 2 notifies the controller 6 and sends information about the activity to the controller 6 for further processing. The log auditing function 2 is described in FIG. 2. The login anomaly detection function 3 monitors system login activity and when anomalous behavior is detected, notifies the controller and sends information about the activity to the controller 6 for further processing. The login anomaly detection function 3 is described in FIG. 3. The logout anomaly detection function 7 monitors system logout activity and if anomalous behavior is detected, notifies the controller and sends information about the activity to the controller 6 for further processing. The logout anomaly detection function 7 is described in FIG. 5. The session monitoring function 4 watches user activity after a login has been established. The function continuously watches keystrokes for known attack signatures and suspicious activity. Signatures are kept in a user-editable database on the local machine. Once suspicious or known attack activity is detected, the session monitor 4 will send information about the activity to the controller 6 for further processing. The session monitoring function 4 is described in FIG. 7. The port scan detector function 5 monitors Internet ports (such as TCP and UDP) for port scanning activity which is a method used by attackers to determine the vulnerabilities of a target host and to run a series of attacks to gain entry on the vulnerable target host. When the port scan detection function 5 detects port scanning activity, it sends information about the activity to the controller for further processing. The port scan detector function 5 is described in FIG. 6. The controller function 6 controls all actions that the host-based intrusion detection system may perform upon being notified from the log audit function 2, the login anomaly detection function 3, the logout anomaly detection function 7, the session monitor 4 or the port scan detector function 5 that an anomalous activity has occurred, the controller takes an appropriate action based on that activity. The controller function is described in FIG. 8.

Figure 2:
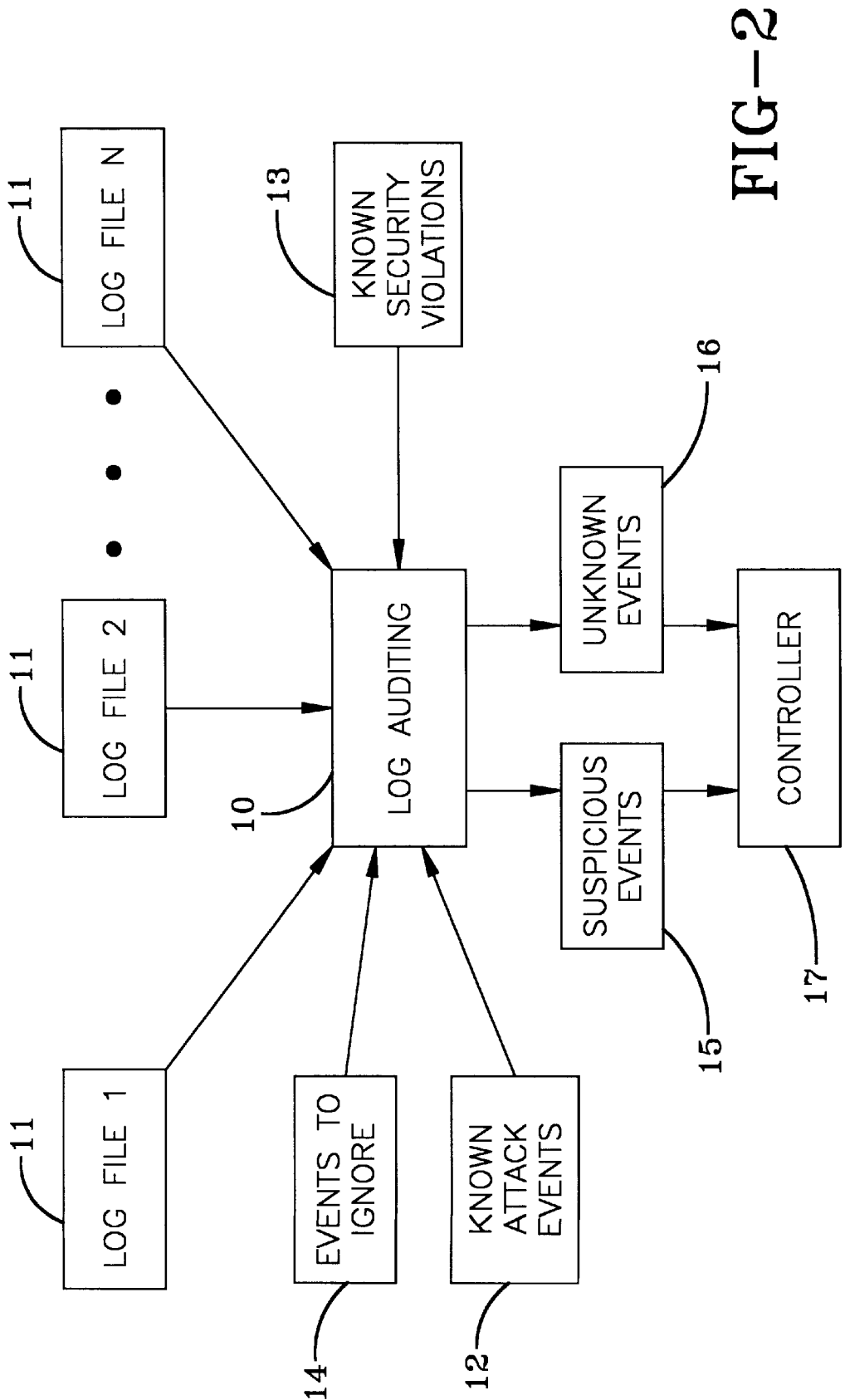
FIG. 2 is a block diagram of the log file auditing function.

Turning now to FIG. 2, a block diagram of the log file auditing function is shown. The log auditing function 10 monitors the system login auditing files 11 by comparing the log file activity known attack events 12, known security violations 13, and events to ignore 14. If the log file activity indicates a known attack event 12 or a known security violation 13 indicating a suspicious event or unknown event has occurred or is in the process of occurring, then the log auditing function 10 constructs a message containing the log file information and signature identification information and forwards it to the controller for action. The log auditing function can run on a periodic basis with the period selected by the user or it can run continuously in real-time. The user has the flexibility to add or remove functions within the login anomaly detection to customize the system.

Turning now to FIG. 3, a flow diagram of the login anomaly detection function 20 is shown. The system monitors login and logout audit files and logs (records) all logins and logouts for the target host 21. The target host is the computer that the user is logging into or logging out of. The system login auditing files may be login records (such as wtmp and utmp records) for a Unix® based operating system or may be event logs for a Windows NT® operating system. The system checks to determine if the user should be ignored 38. Certain users are not checked for login or logout anomalies. If the user is to be ignored processing continues at step 35 where the user is logged into the system. If the user is not to be ignored and if the user is logging in to the system, the monitor builds/updates the user profile database 22 and updates the active user database as shown in FIG. 4. The system administrator has the flexibility to add or remove functions within the logout anomaly detection to customize the system.

Turning now to FIG. 4, a flow diagram is shown of the user profile database and active user database update function. If the user is not in the user profile database 23, then the user is a new user and process first login function is executed 24. A new user profile entry is created 24 which contains the user name, the login host, the login terminal (sometimes called the TTY), the time of creating the initial user profile, the time of the user's first login, the set days and hours the user is allowed login access, the version of the database record type and sets the initial number of logins to one. In addition, the system administrator notified whenever a user logs into a host for the first time. If the user is already in the user profile database 23, then a user profile entry already exists for this user and that profile is updated 25. The updates to the user profile include appending the login time, login host and incrementing the total number of logins. The system also checks to determine that the user's login account is still valid, that is that it has not been disabled by a system administrator. An entry is created in the active user database 36 which contains the user's name, the terminal the user is logged in on, the time of login for this entry and the version of the database record.

Turning back to FIG. 3, the next step is to check to determine if the login is from a foreign domain 26. A foreign domain is one that is not contained within or allowed access to the host where the login is attempted. The list of allowed domains within the system is accessed 27 and if the login domain is not listed, it is considered foreign and the control function is notified 37.

The user login is checked to determine if there are multiple concurrent logins for the same user 28 A multiple concurrent login means that a user is logged into the system more than once from one or more different hosts concurrently. This type of behavior may indicate an intrusion. The log file is checked to determine if a user is logged in from one or more different hosts concurrently. If so and the user is not allowed to have multiple logins 29, then this login entry is denied and the multiple users are logged off from the system 30.

The next step is to determine if the user is logged in at an unusual time 31. For each user, a profile is automatically built of the days, times and length of time that the user has logged in. Once a certain threshold number of user logins have occurred for this user to allow for accurate user profiling (usually approximately ten logins, but this can be adjusted by the user), the day and time of the current user's attempted login is compared to that profile. If the current login time differs from the user's login profile, the control function is notified 37.

The next step is to compare the login activity with known attack patterns 34. If the login activity is similar to a known attack pattern, then the control function is notified 37. Next the history file is checked for suspicious command entries 39.

If these steps are successfully completed, the user is logged in 35 and the user's profile database entry is updated and the active user database is updated to track the login state of the user.

Figure 5A:
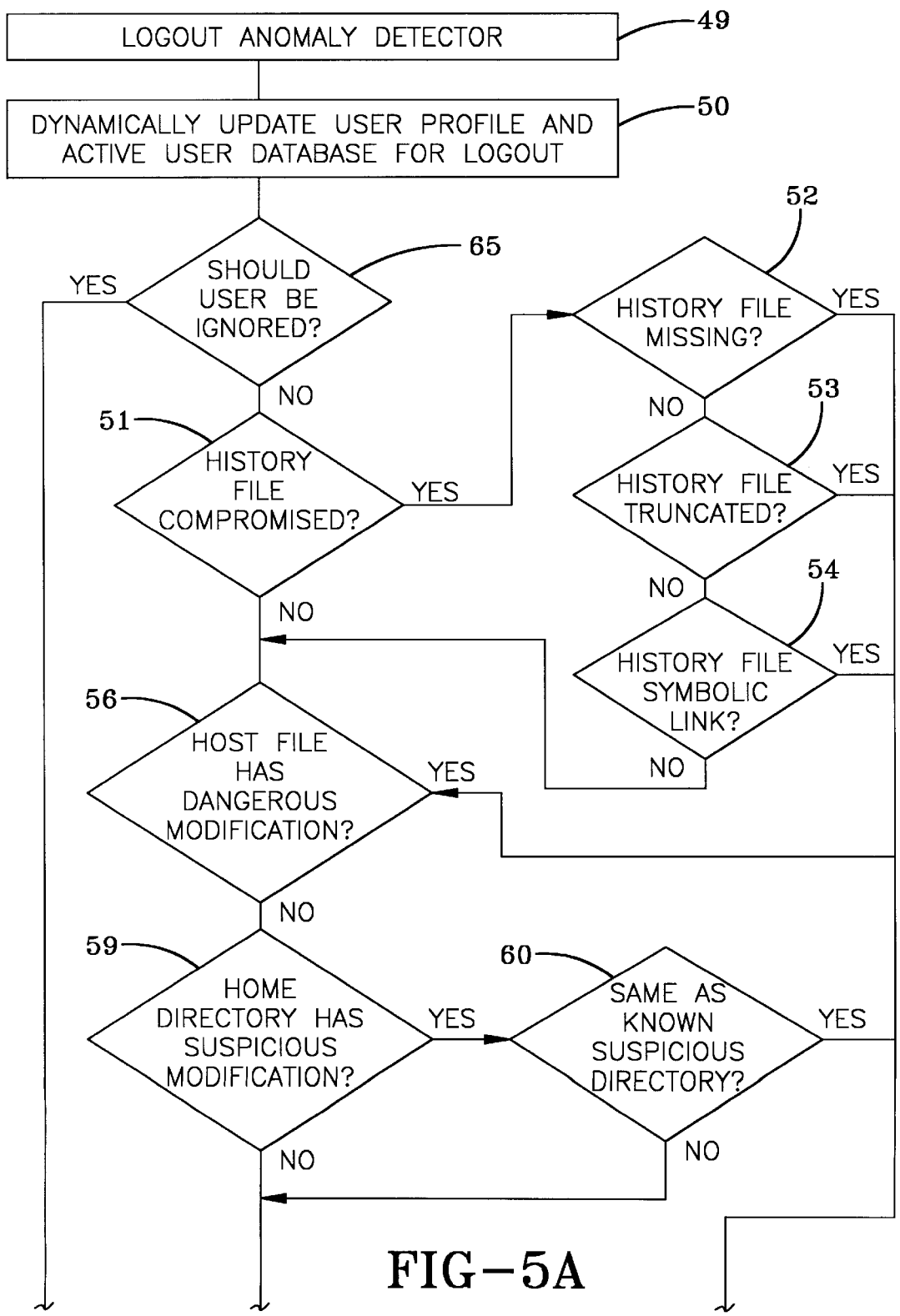
FIGS. 5A and 5B are flow diagrams of the logout anomaly detection function.
Figure 5B:
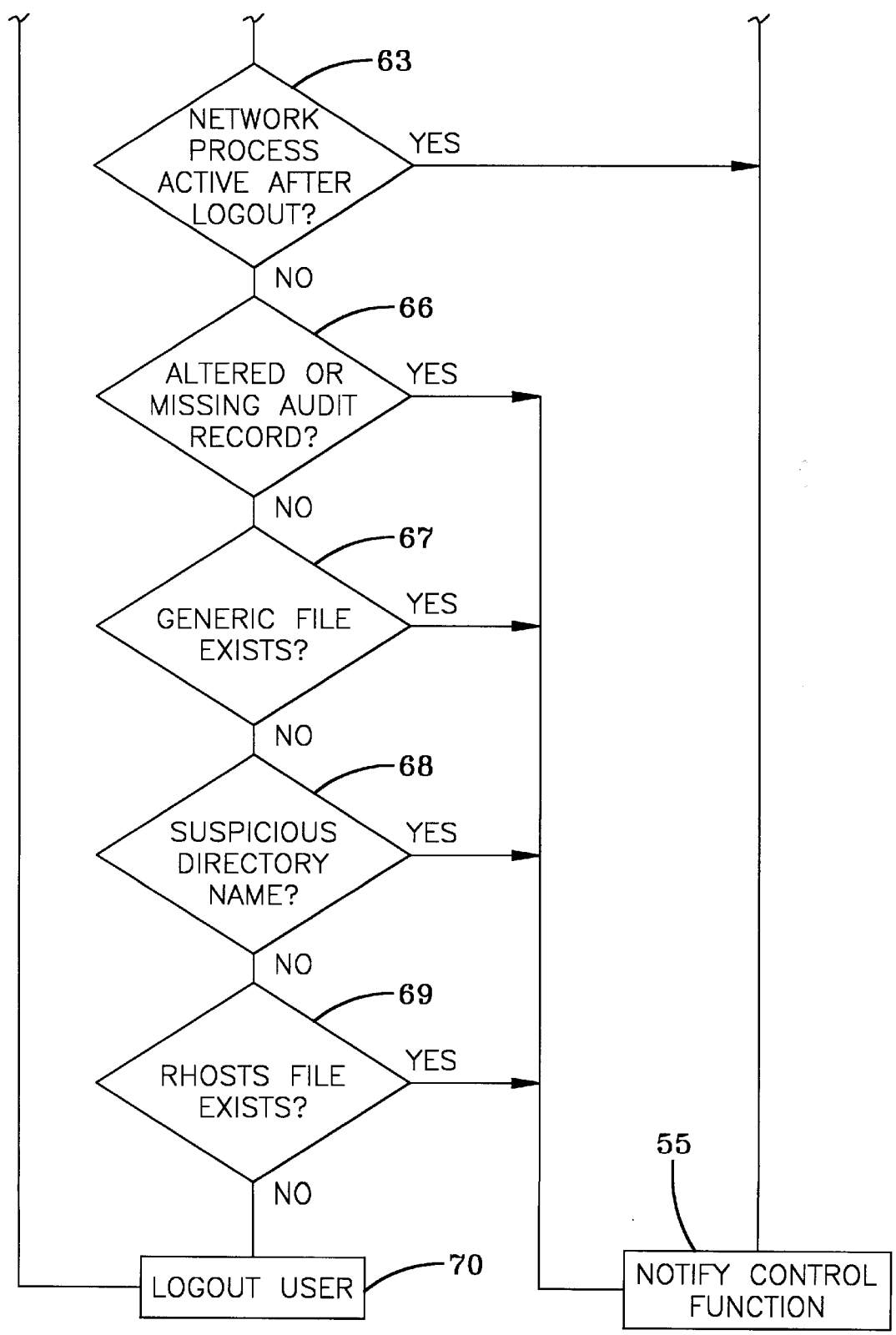

Turning now to FIGS. 5A and 5B, flow diagrams of the logout anomaly detection function are shown. When a user attempts to logout, the logout anomaly detector 49 goes through a series of steps to process the logout to determine if something has occurred during the user's login time that may indicate a system anomaly. The logout entry for the user is updated in the user profile and the active user database is updated 50. If the user is to be ignored 65, then no other checking is done and the user is successfully logged out 70. The next step is to determine if the user's file history has been compromised 51. If the history file no longer exists 52, the history file has been truncated 53 or the history file is a symbolic link 54, the event is logged and information about the event is sent to the controller 55. The system examines the rhost file and other system authentication files to determine if dangerous security modifications to the host file have occurred 56. For example, entering a wildcard symbol, allows the host to allow anyone to log in without a password. If the host has been altered to allow anyone to login without a password or if other activity has occurred that may compromise security, the event is logged and information about the event is sent to the controller. The next step is to determine if the user's home directory contains one or more suspicious directories 59. Intruders will sometimes name a local directory in an odd way to hide their work. The system checks for known suspicious directories 60 and if it finds any, it may log the event and send information about the event to the controller 55. If a network computer process (sometimes called a "daemon") is left operating after logout 63 this could indicate a suspicious login and event is logged and information about the event is sent to the controller 55. The system checks to determine if the system audit records have been altered or are missing 66. If so, the control function is notified 55. Next the program checks an administrator generated list of generic files to see if one or more of them exists in the user's home directory 67. If so, the control function is notified. Next, if a suspicious directory name is found 68, the control function is notified 55. If an rhost file exists, the control function is notified 69.

Figure 6:
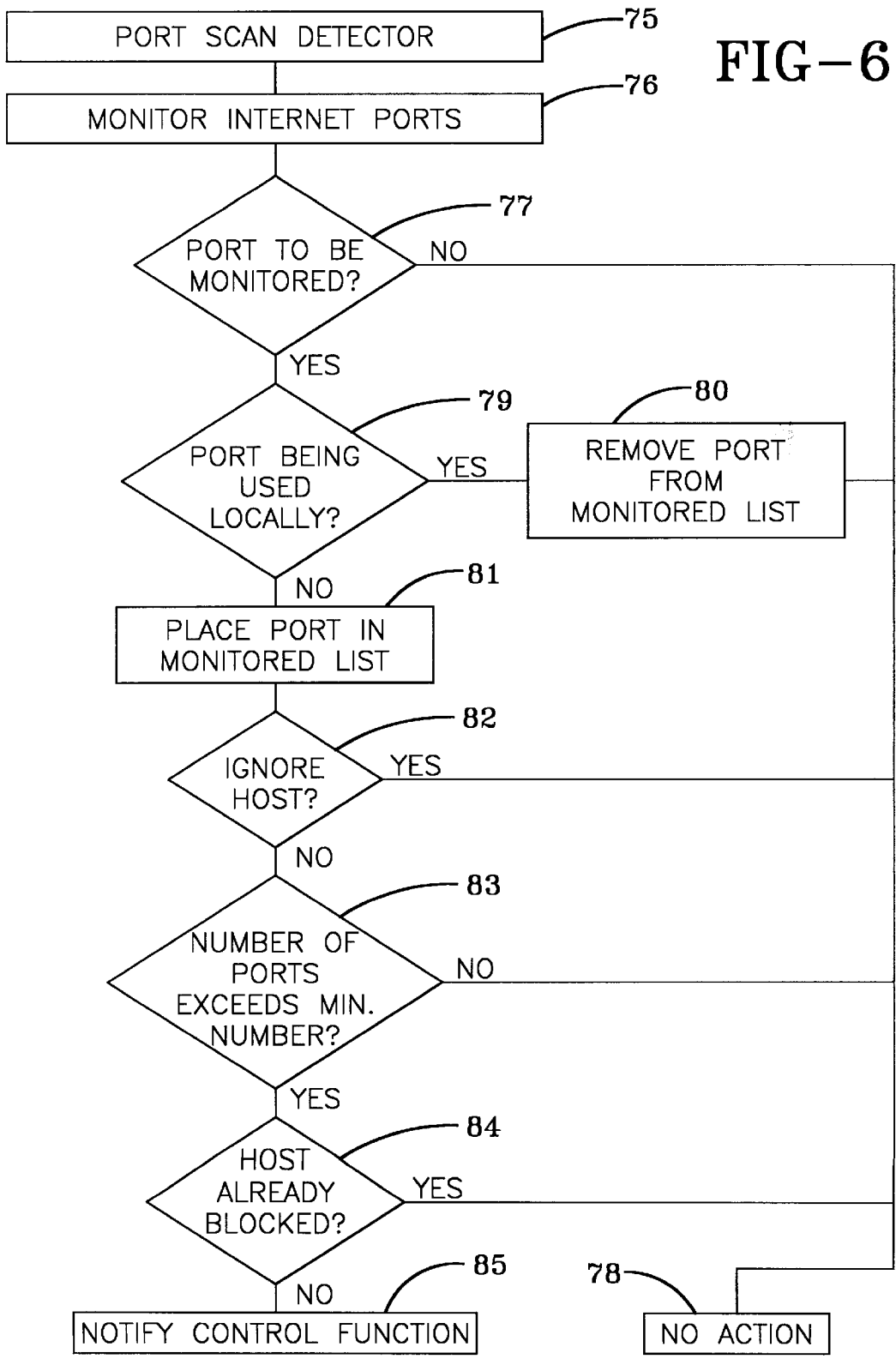
FIG. 6 is a flow diagram of the port scan detector function.

Turning now to FIG. 6, a flow diagram of the port scan detector is shown. Port scanning is a method used by attackers to determine the vulnerabilities of a target host. Once vulnerabilities are found, a series of attacks are usually run to gain entry. Port scanning makes use of the TCP/IP protocol, which is the core communication protocol of the Internet. It allows machines to communicate throughout the world in a reliable manner. One of its features is the use of protocol "ports" on remote and originating systems to establish connections between hosts. The ports available on a host are usually between the ranges of 1 to 65535, with ports 1 to 1024 being what is commonly referred to as "reserved" for use by critical Internet services. Each port that presents a service to a remote user is usually registered with the Internet Assigned Numbers Authority registry (IANA). This registration ensures that programs know what ports to avoid or specifically connect to depending on the services being requested. Examples of commonly used ports are:

21—File Transfer Protocol (FTP) services.

25—Simple Mail Transfer Protocol (SMTP) services.

80—HTTP services (WWW servers)

When an attacker is looking for a new host to penetrate, they will often begin by looking for Internet programs that have known exploitable problems. These programs (called "daemons") vary in number and degree of susceptibility to problems. As new problems are found the hacker community quickly makes use of them to penetrate more hosts. To facilitate looking for new victims, the attacker will use a program that may either: connect to all ports on the remote machine or deliberately pick one or more ports to search for a particular problem. Some of the ports may not answer, in which case the attacker moves on. Other ports will answer and the attacker can then glimpse at what problems they can take advantage of. Often attackers will go from host to host on the Internet looking for the same problem to exploit. An example port scan of a host may return the following information:

| | | |
|---|---|---|
| localhost | telnet | 23/tcp |
| localhost | smtp | 25/tcp |
| localhost | finger | 79/tcp |
| localhost | http | 80/tcp |
| localhost | pop | 110/tcp |
| localhost | imap | 143/tcp |

The port scan detector of the present invention alerts administrators that a person is actively looking for services on their host in a manner that indicates a hostile action. In the above port scan example our detector could present "fake" ports that an attacker will likely scan for. This could change the above port scan into the following:

| | | | |
|---|---|---|---|
| localhost | fake | 23/tcp | (Fake port) |
| localhost | smtp | 25/tcp | |
| localhost | fake | 79/tcp | (Fake port) |
| localhost | http | 80/tcp | |
| localhost | fake | 110/tcp | (Fake port) |
| localhost | fake | 143/tcp | (Fake port) |

So even though in our example system there are only ports 25 and 80 active, the other ports will be tripwired by the port scan detector waiting for an attacker to unwittingly try to connect to them. When this occurs, the administrator or program can then take action to prevent this activity. In FIG. 6, a flowchart of the port scan detector function 75 is shown. Internet ports (such as TCP and UCP) are monitored 76. If the port is in a list indicating that the port is not to be monitored 77, processing ends and no action is taken 78. If the port is in a list indicating it is to be monitored 77, the next step is to determine if the port is being used locally 79. If the port is being used locally it is temporarily removed from the monitored list until it is no longer used locally 80. If the port is not being used locally, the port is placed in the list of ports to be monitored 81. If the terminal or host computer where the user is attempting to log in from is a terminal or host to be ignored for port scanning 82, no action is taken 78. If the terminal or host computer is not to be ignored 82, then if the number of ports that are being scanned is less than a minimum number of ports 83, no action is taken 78. If the number of ports that are potentially being scanned is greater than or equal to the minimum number of ports 83, the next step is to determine if the terminal or host computer where the user is attempting to log in from is already blocked from the system 84. If so, no action is taken 78. If not, information about the apparent port scan is sent to the controller 85 and the controller then takes the appropriate action as discussed in FIGS. 8 and 9 below. The appropriate actions can vary from logging the event, blocking access to the computer system from the attacking host or executing a user-supplied command.

Figure 7:
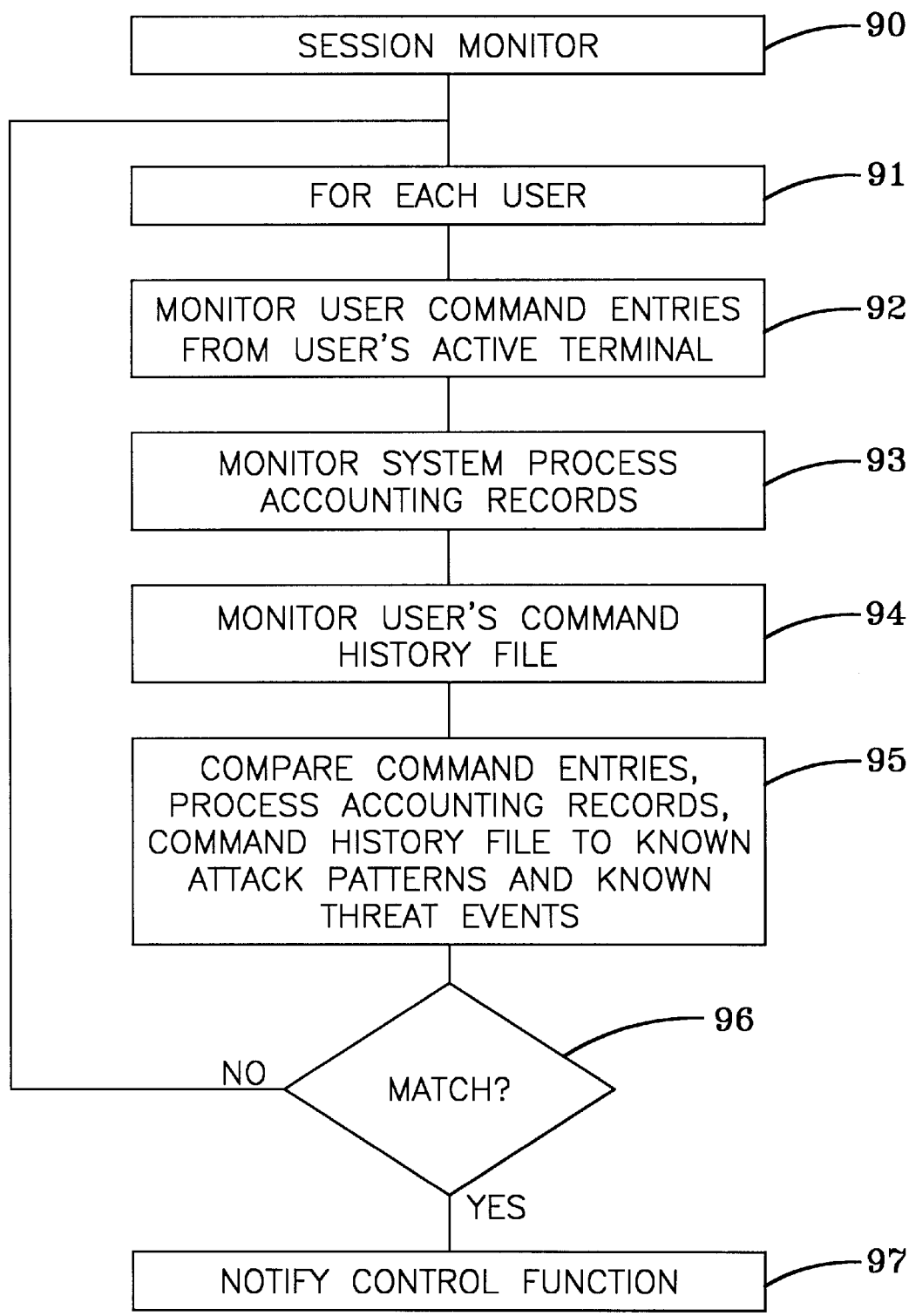
FIG. 7 is a flow diagram of the session monitor function.

Turning now to FIG. 7, a flow diagram of the session monitoring function 90 is shown. For each user, the session monitor continuously monitors user activity for a threat to the computer system 91. It continuously monitors the user command entries 92, the system process accounting records 93, and commands entered by the user as stored in the user's command history file 94. It compares the command entries 92, system process accounting records 93 and commands in the user's command history file to known threat events and known attack patterns indicating a computer intrusion 95. If a match occurs 96, information and notification is sent to the control function 97. In either case the continuous session monitoring process continues its dynamic monitoring at step 91.

Figure 8:
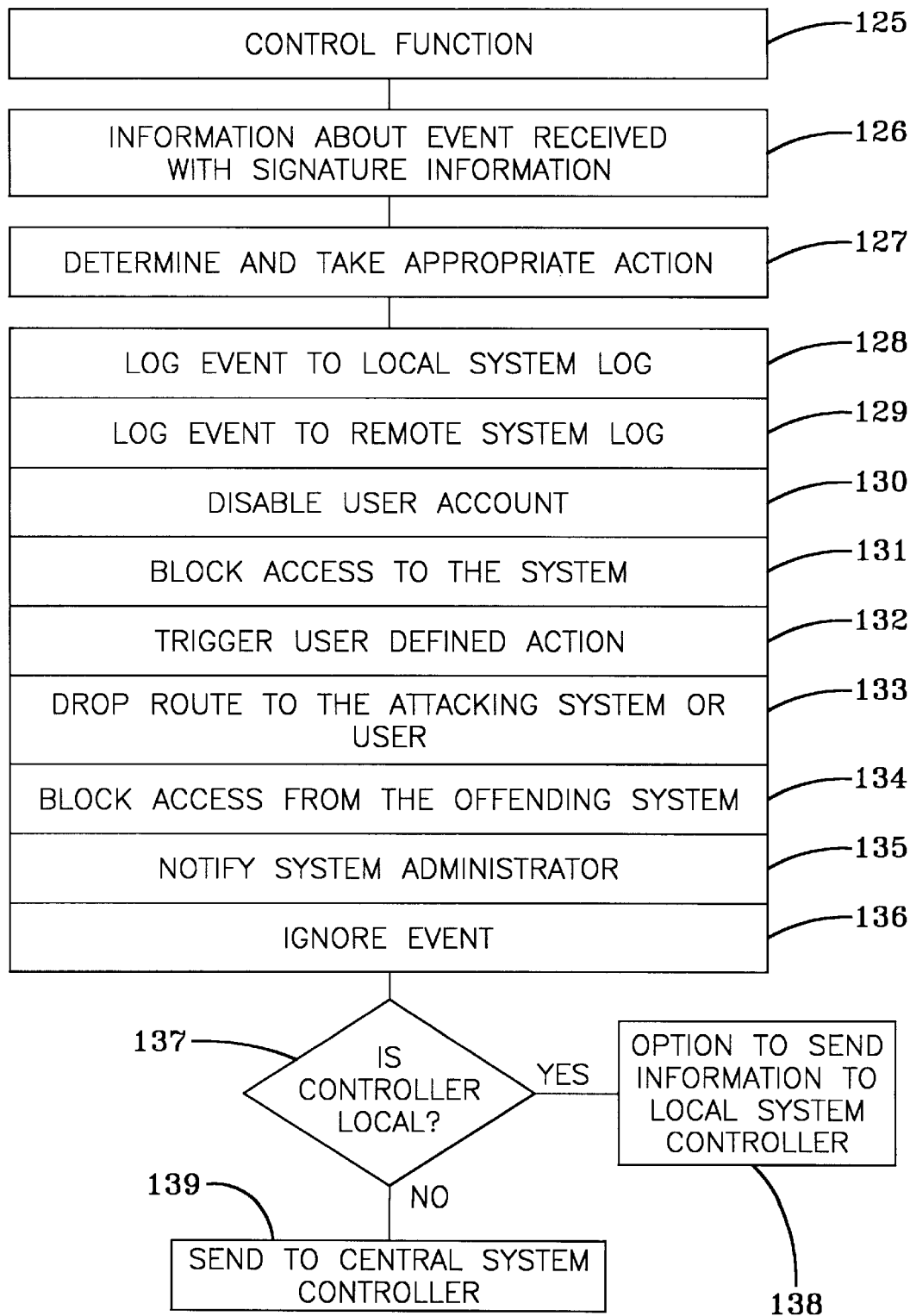
FIG. 8 is a flow diagram of the controller function.

Turning now to FIG. 8, a flow diagram of the control function is shown. The controller 125 receives information about events and receives signature information to identify the user and type of event 126. Because the controller may be local to the system, the system can function in real time for suspicious events. In addition, if the controller is local, the intrusion detection system can be located entirely within the local host computer. The controller then determines the action to be taken and takes appropriate action 127. The action may be to log the event to the local system log 128, log the event to a remote system log 129, disable the user's account 130, block access to the attacking host system address 131, trigger a user defined event 132, drop the route to the offending system 133, block network access from the offending system 134, notify the system administrator 135, to ignore the event 136 or any combination of these actions. If the controller is a local controller 137, the local controller can send the information to a central system controller 138. Alternatively, the system controller 139 can take the appropriate actions (127–136) instead of the local controller.

Figure 9:
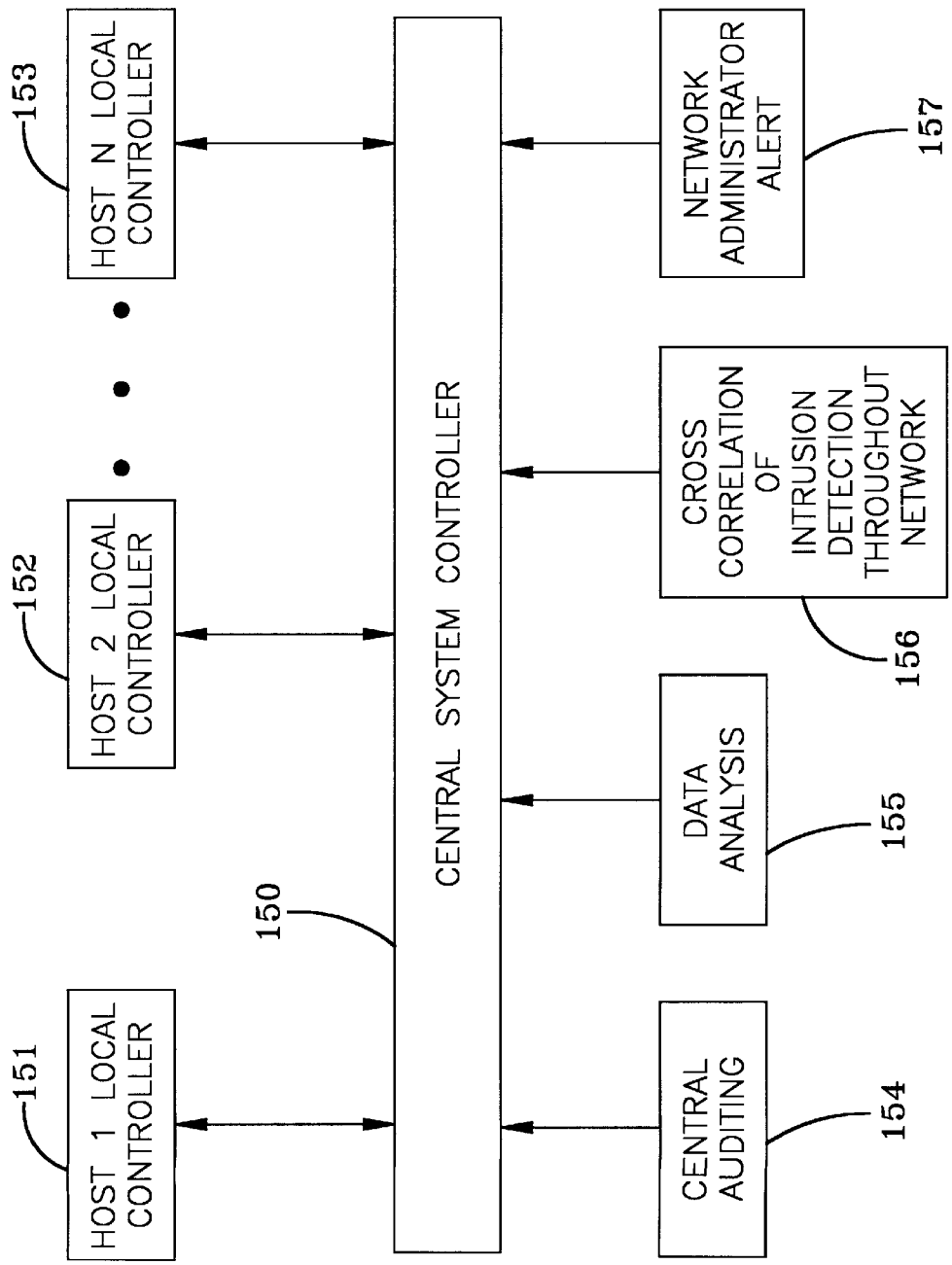
FIG. 9 is a block diagram of an alternate embodiment of a host based intrusion detection system having a central system controller.

FIG. 9 shows a block diagram of an alternate embodiment of a host based intrusion detection system having a central system controller. The central system controller 150 may be part of a network that contains multiple host computers (1 through N) 151–153. Each host 151–153 comprises a local controller that sends information about log auditing, login anomaly detection, logout anomaly detection, session monitoring and port scan detector functions to the central controller. The central controller can perform centralized auditing of events 154, data analysis 155, cross correlation of intrusion activity throughout the network 156 and can alert the network system administrator 157 if anomalous activity if found. In addition, the central controller 150 can send information about anomalous activity found within the system back to the multiple hosts 151–153 so as to alert the hosts.

Figure 10:
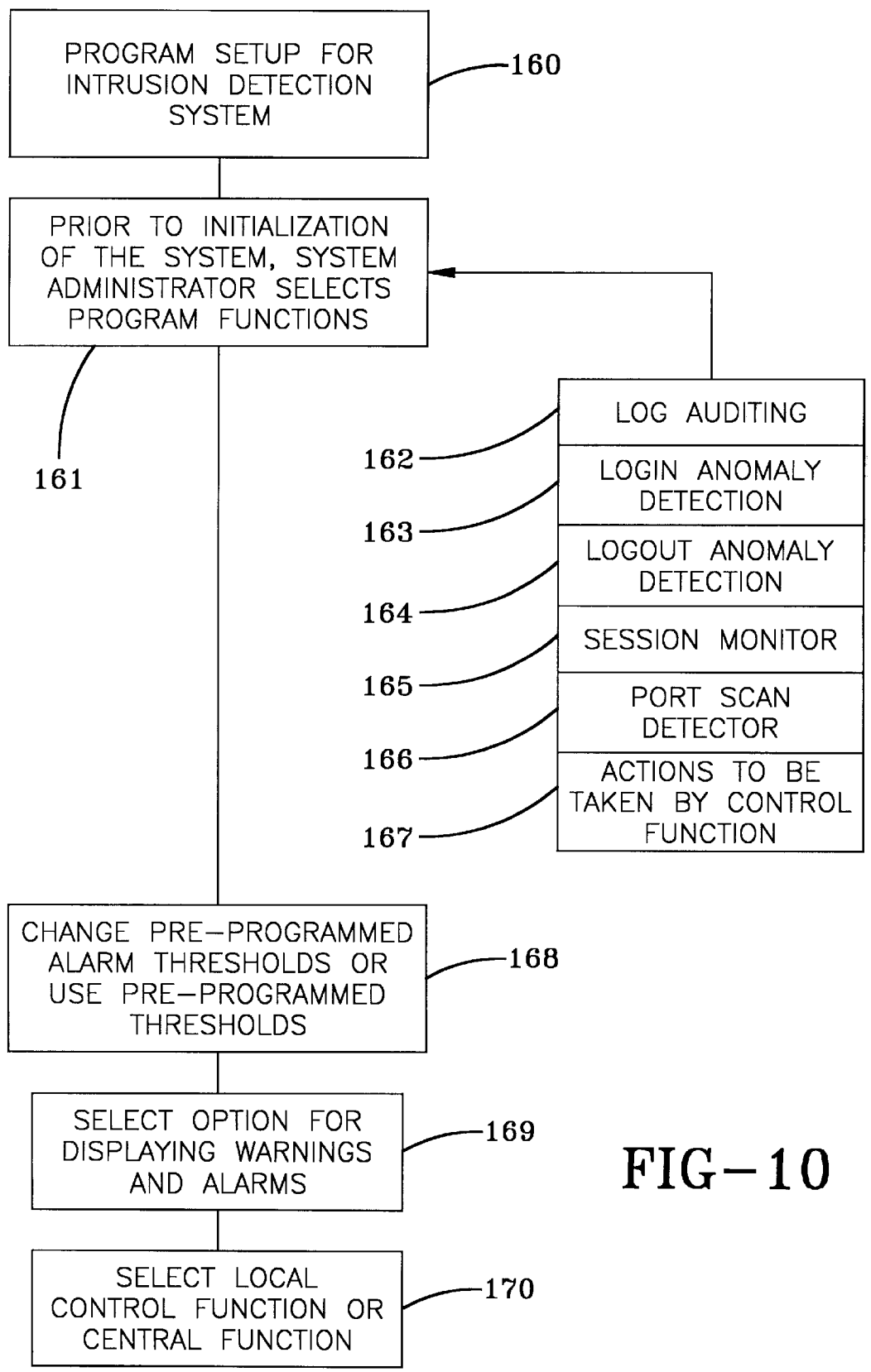
FIG. 10 is a flow diagram of program setup for the intrusion detection systems.

FIG. 10 is a flow diagram of a program set up for the intrusion detection system. Prior to initialization of the intrusion detection system, the system administrator 161 may select program functions to run in the intrusion detection system. For example, the system administrator may select the log auditing function 162, login anomaly detection 163, logout anomaly detection 164, session monitor 165 and port scan detector 166. The system administrator may also select the actions to be taken by the control function if an unauthorized user or event occurs 167. If the system administrator chooses not to select functions, the preprogrammed default functions will run. If the system administrator chooses not to select the actions to be taken by the control function or only changes some of the actions, the preprogrammed default actions will used. The system administrator may also alter the alarm thresholds or use preprogrammed alarm thresholds 168. The system administrator may select whether a warning is to be displayed on the system administrators graphical user interface 169. The system administrator may also select whether a local or central controller will be used for reporting and for taking action 170.

FIG. 11 is a block diagram of the software modules of the Login Anomaly Detector. The Login Anomaly Detector 3 comprises a login audit module 180, first login warning module 181, a foreign domain warning module 182, a multiple concurrent logins module 183 and an odd login time module 184.

The login audit module 180 logs all user logins into the target host computer. This information is recorded in the system audit records and the intrusion detection system also records this information. The login audit module 180 provides secondary audit trail of user activity in case the system audit files are damaged or altered.

The first login warning module 181 notifies the control function and or administrators whenever a user logs into a host for the first time. After the first login the module will no longer activate. The first login warning module 181 detects a first time login by noting whether the user has more than one login in the dynamic user database. It is used to spot users who are not authorized to connect to the computer system.

The foreign domain warning module 182 notifies administrators whenever a "foreign" domain login is detected by a user. The foreign domain warning module 182 checks the Internet domain the user is logging in from as indicated in their user database login record. If the domain is not listed in an "allowed" file, it assumes the domain is "foreign" and notifies the administrator. The foreign domain warning module 182 allows an administrator to spot logins from odd places that are not allowed to connect to the target host computer.

The multiple concurrent logins module 183 watches user logins and looks for concurrent logins from multiple domains. When a user is logged in from multiple domains at the same time, this may be an indication of suspicious activity. The multiple concurrent logins module 183 module will monitor logins and if it spots a user that is logged in more than once or is logged in from two or more separate domains/hosts, it will notify a control function and or the system administrator. Hackers often will log in from multiple hosts across the Internet or within a local network. The multiple concurrent logins module 183 attempts to detect this condition.

The odd login time module 184 monitors user logins and attempts to spot "unusual" login times based on past data collected for this user. Odd login times are one of the primary indicators of unauthorized system intrusion. The odd login time module 184 runs only after a predetermined amount of user logins have been collected by the user database. This amount defaults to ten logins, but can be adjusted by the user or system administrator to begin comparing login times after any amount has passed, although sufficient time should be granted to allow accurate profiling. The theory of operation is to take the average login hours from the login tracking field for a particular user. This average is used to draw conclusions about the user's login habits including the days they log into the computer, the times they log into the computer and how long they stay logged into the computer.

This data can be obtained because the login stamp for each login tracking entry is dynamically maintained by the login monitoring process. Because the database is dynamically generated the signature can be built with intelligence to take advantage of this fact to reduce false alarms. This relieves the administrator of having to setup predefined login profiles for users. This is a great benefit if you have an eclectic user base who work strange hours or login from multiple time zones. The values derived are obtained by calculating the days/hours/minutes. These values can be combined in a number of ways to determine normal patterns of behavior such as days of the week the user is active and for how long they use the system at a time. Further pieces of information can be derived such as average hours online per day and the hours they are normally working between.

FIG. 12 is a block diagram of the software modules of the Logout Anomaly Detector. The Logout Anomaly Detector 7 comprises a logout audit module 190, suspicious entries in user's home directory 191, generic file exists module 192, history file truncated/altered module 193, suspicious directory name module 14, altered/missing audit record module 195, network process active module 196, suspicious history file commands module 197, and rhost file exists module 198.

The logout audit module 190 logs all user logouts from the target host computer. This information is recorded in the system audit records and the intrusion detection system also records this information. The logout audit module 190 provides secondary audit trail of user activity in case the system audit files are damaged or altered.

The suspicious entries in user's home directory module 191 checks the for a ".rhost" file in the user's home directory with a dangerous entry. Dangerous entries include wildcard characters. If a wildcard character is found, the suspicious entries in user's home directory module 191 alerts the administrator that a dangerous .rhost file exists. Dangerous entries indicate suspicious activity for most users and may allow the host system to be easily compromised by remote attackers.

The generic file exists module 192 module checks an administrator-generated list of files to see if one or more of them exist in the user's home directory. This module allows an administrator to flag certain files for monitoring (password files, etc.) and generate custom alerts. A file list is used to parse against the user's directory listing. If a matching file name is found the event if flagged and the control function and or system administrator alerted.

The history file truncated/altered module 193 module checks a user's command history file for alterations or truncations. Hackers often alter the history file to conceal activity on a host. The module checks to determine if the history file is truncated to zero bytes long, is missing or deleted and if the history file is a "symbolic link" to another file or device. If the history file indicates that any of these conditions have occurred, this may that unauthorized activity is being hidden on many attacked hosts. When an altered history file is found it is reported to central controller and system the administrator may be notified.

The suspicious directory name module 194 detects suspicious directory names. Hackers will often employ odd directory names in order to hide activity on a host. This module searches for common directory name hiding tactics. For example, this module will check a user's home directory for odd directory names such as: ". .", ". . .", etc. and notify the control function and report them to the administrator if one is found. The directory names that can be searched for are configurable by the administrator.

The altered/missing audit record module 195 checks to determine if an entry for the user's session is missing from the systems audit records (such as utmp, wtmp, event logs or the like). Intruders will use commonly available utilities to purge audit records of their tracks. An altered or missing entry may indicate that the user has deleted or altered their system audit record entry to avoid detection. The altered/missing audit record module 195 checks the pertinent system accounting records (utmp, wtmp, event logs or the like) and ensures that a matching record exists for the session that the user is logging out of. A missing record indicates that the user may be trying to conceal their activity on the host. This module attempts to analyze the login/logout records of the host to spot this condition and notify the administrator.

The network process active module 196 checks to determine if a user has logged out of the system and left a process running with a listening network. A listening socket on a network host is a program that is offering services to the Internet. Typically a socket is a number in the range of about 1–65535 that a user can connect to using one of the Internet protocols. An example of common socket numbers include: 23 for Telnet services, 25 for mail services and 80 for worldwide web services. If a user executes a rogue program with a listening socket they can connect back to the system from anywhere on the Internet and bypass normal authentication and audit procedures of the target host. Therefore, programs with listening network sockets run by ordinary users are a security threat and should not be allowed on any host. This could indicate that an unauthorized program is running. The network process active module 196 checks the system process table for network socket programs and alerts the controller and system administrator to this fact.

The suspicious history file commands module 197 checks to determine if the history files contain commands that could be considered "suspicious". Most Unix systems have the ability to store a "command history" of all logged in users. This command history is used by the interactive shells to allow users to quickly recall commands either manually or with a script. As part of this feature the interactive shells (depending on their type) will write a "history" file in the user's home directory. Usually this file is called ".history" but other variations exist. The basic operation occurs when a user logs out of the host system. During this time the login file is flushed to the disk and the login monitor process can begin reading the most current command history. This module then takes the history file and compares the command contents to a known database of unusual or suspicious commands. Such commands may include commands that indicate the user has viewed the master password list on the system, the user has added a global wildcard to the system which will allow all hosts access to the system, the user has tried to copy the password file list and the user has tried to switch to system administrator credentials. When suspicious commands are spotted, they are flagged and the appropriate actions can be taken by the monitor program to alert the controller and system administrator or disable the user account.

The .rhost file exists module 198 checks for the existence of a ".rhost" file in the user's home directory. The .rhost files contains a list of hosts that are trusted by the system when a login is detected originating from them. If a user is originating form a host that is listed in the .rhost file, then they are allowed access to the system as long as their account name matches the owner of the .rhost file. If an entry such as "++" is placed in the .rhost file, it signifies a wildcard and any host can log into the system as the owner of the rhost file. A wildcard entry is always suspicious and is virtually always a dangerous modification. If an .rhost file exists in the user's directory, and is greater than zero bytes, then the controller is notified and the system administrator may be alerted.

Although the present invention has been described in detail with reference to certain preferred embodiments, other embodiments are possible. Therefore, the spirit and scope of the appended claims should not be limited to the description of the preferred embodiments herein.

What is claimed is:

1. A network-independent, host-based computer implemented method for detecting intruders in a host computer, the method comprising the steps of:
    a. at the host computer, detecting an unauthorized user attempting to enter into the host computer by comparing actions of the user to a dynamically built profile for the user, and if the action is out of range of the user profile, notifying a control function at the host computer;
    b. at the host computer, detecting events that indicate an unauthorized entry into the host computer has occurred and if an event occurs that indicates unauthorized entry, notifying a control function; and
    c. executing an action in response to the event by the control function.

2. The method of claim 1 wherein the dynamically built user profile comprises:
    a. at the host computer, dynamically constructing a user profile for each computer user when the computer user first attempts to log into the host computer;
    b. at the host computer, dynamically updating the user profile for the user for each attempt by the user to log into the system after the first attempt; and
    c. updating the user profile when the user logs out of the host computer.

3. The method of claim 1 further comprising dynamically monitoring host computer log files for events that indicate an unauthorized attempted entry into the host computer.

4. The method of claim 3 wherein the dynamically monitoring host computer log files comprises:
    a. at the host computer, comparing the system log files to events to ignore and ignoring the event if the system log file indicates a match with the event to ignore; and
    b. at the host computers, comparing the system log files to events known to indicate an unauthorized entry into the computer system and notifying a control function about the unauthorized entry;
    c. automatically executing a specific action in response to the event by the control function.

5. The method of claim 1 further comprising:
    a. at the host computer, dynamically monitoring user actions after the user has logged into a computer system for unauthorized access by the user to system information, and if unauthorized access occurs, notifying a control function about the unauthorized access and automatically executing a specific action in response to the event by the control function; and
    b. at the host computer, dynamically monitoring user actions after the user has logged into a computer system for corruption of system information by the user and if corruption of system information occurs, notifying a control function that corruption of system information and automatically executing a specific action in response by the control function.

6. The method of claim 1 further comprising:
    a. at the host computer, scanning network ports to determine if a user has connected to more than a selected number of network ports;
    b. if the user has exceeded the selected number of network ports, at the host computer, notifying the control function and automatically executing a specific action in response to the event by the control function.

7. The method of claim 6 wherein the selected number of network ports is set by the system administrator.

8. The method of claim 1 wherein the detecting events that indicate an unauthorized entry into the host computer comprises:
    a. at the host computer, detecting anomalous events when a user logs out of the computer system comprising:
        i. monitoring a user's file history to determine if the user's file history has been altered;
        ii. monitoring computer system files to determine if a modification has been made that indicates an unauthorized intrusion into the computer system;
        iii. monitoring a user's computer files to determine if a modification has been made that indicates an unauthorized intrusion into the computer system;
        iv. determining if a program has been left running that should have stopped running when the user logs out of the computer system; and
    b. if an anomalous event has been detected:
        i. notifying a control function about the anomalous event; and
        ii. allowing the control function to take user specified action in response to the anomalous event.

9. The method of claim 1 wherein the detecting unauthorized users comprises:

a. if the user has attempted to log in from a computer that is not allowed access to the host computer, notifying the control function about the attempted login; and
  b. allowing the control function to take action in response.

10. The method of claim 1 wherein the detecting unauthorized users comprises:
  a. if the user attempts to log into the host computer and has an active login, at the host computer checking to determine if the user is allowed to have more than one login active simultaneously, and if not notifying a control function about the attempted login; and
  b. at the host computer, automatically executing a specific action in response to the event by the control function.

11. The method of claim 2 wherein the dynamically constructed user profile for each computer user comprises storing user name, login terminal, time of creation of initial user profile, time of user's first login, time history of the user's logins, time periods that the user is allowed to log into the system and total number of logins for the computer user.

12. The method of claim 11 wherein the user profile is stored in a user profile database.

13. The method of claim 11 wherein the dynamically updating the user profile for the user comprises, for each user, entering the current login time, login terminal, updating the time history of the user's login and incrementing the total number of logins.

14. The method of claim 11 wherein the detecting unauthorized users comprises if the user has attempted to log in at a time different from the time periods that the user is allowed to log into the computer system, notifying the control function about the attempted login and allowing the control function to take user specified action in response.

15. The method of claim 1 further comprising:
  a. at the host computer, dynamically constructing a list of active users logged into the host computer; and
  b. at the host computer, dynamically updating the list of active users when a user logs into the host computer and logs out of the host computer.

16. The method of claim 15 wherein the list of active users comprises user name, user terminal and time of user login.

17. The method of claim 1 wherein the control function comprises:
  a. storing information about unauthorized users and events that indicate an unauthorized entry into the host computer;
  b. taking action in response to the unauthorized users and events, the action is selected from the group consisting of:
    i. logging the information in a local controller;
    ii. sending the information to a network controller;
    iii. disabling the unauthorized user's account;
    iv. blocking access to the host computer for the user;
    v. notifying a system administrator; and
    vi. ignoring the unauthorized user and unauthorized entry.

18. The method of claim 17 wherein the action taken is defined by the system administrator prior to initialization of the host computer.

19. The method of claim 1 wherein the control function is located in the host computer where the unauthorized user and unauthorized entry occurred.

20. The method of claim 19 further comprising the control function in the host computer sends information about unauthorized users and events to a central computer connected to the host computer.

21. The method of claim 1 wherein the control function is located in a central computer connected to the host computer.

22. The method according to claim 21 further comprising multiple host computers connected to the central computer.

23. The method of claim 22 wherein the control function in the central computer comprises:
  a. performing centralized analysis of unauthorized users and events;
  b. performing correlation of unauthorized users and events from the multiple host computers;
  c. alerting a central computer system administrator; and
  d. sending the analysis and correlation results to the multiple host computers.

24. The method of claim 1 further comprising:
  a. for each user, continuously monitoring user activity for a threat to the host computer; and
  b. the continuously monitoring comprises analyzing user command entries and comparing the entries to known threat events and known attack patterns indicating a computer intrusion and if a match occurs, notifying the control function and allowing the control function to take action in response.

25. The method of claim 24 further comprising continuously monitoring the host computer process accounting records and comparing the entries to known threat events and known attack patterns indicating a computer intrusion and if a match occurs, notifying the control function and allowing the control function to take action in response.

26. The method of claim 24 further comprising continuously monitoring commands entered by the user and comparing the commands to known threat events and known attack patterns indicating a computer intrusion and if a match occurs, notifying the control function and allowing the control function to take action in response.

27. The method of claim 1 further comprising continuously monitoring network port activity and comparing the activity to known threat events and known attack patterns indicating a computer intrusion and if a match occurs, notifying the control function and allowing the control function to take in response.

28. The method of claim 22 wherein the action taken is selected from the group consisting of logging the event, removing the user from the host computer and executing a selected command.

29. Computer executable software code stored on a computer readable medium, the code for a network-independent, host-based computer implemented method for detecting intruders in a host computer, comprising:
  a. code for detecting an unauthorized user attempting to enter into the host computer by comparing actions of the user to a dynamically built profile for the user, and if the action is out of range of the user profile, notifying a control function;
  b. code for detecting events that indicate an unauthorized entry into the host computer has occurred by comparing and if an event occurs that indicates unauthorized entry, notifying a control function; and
  c. code for automatically executing a specific action in response to the event by the control function.

30. The computer executable software code method of claim 29 wherein the user profile comprises:
  a. code for dynamically constructing a user profile for each computer user when the computer user first attempts to log into the host computer;
  b. code for dynamically updating the user profile for the user for each attempt by the user to log into the host computer after the first attempt; and c. code for updating the user profile when the user logs out of the host computer.

31. A computer-readable medium having computer-executable software code stored thereon, the code for a network-independent, host-based computer implemented method for detecting intruders in a host computer, comprising:
   a. code for detecting an unauthorized user attempting to enter into a host computer by comparing actions of the user to a dynamically built profile for the user, and if the action is out of range of the user profile, notifying a control function;
   b. code for detecting events that indicate an unauthorized entry into the host computer has occurred by comparing and if an event occurs that indicates unauthorized entry, notifying a control function; and
   c. code for automatically executing a specific action in response to the event by the control function.

* * * * *